United States Patent [19]
Li

[11] Patent Number: 5,286,944
[45] Date of Patent: Feb. 15, 1994

[54] METHOD OF MANUFACTURING A MULTIPLE MICROELECTRODE ASSEMBLY

[75] Inventor: Hong Li, Cambridge, Mass.

[73] Assignee: Panasonic Technologies, Inc., Cambridge, Mass.

[21] Appl. No.: 856,237

[22] Filed: Mar. 25, 1992

[51] Int. Cl.⁵ .............. B23K 15/00; B23K 26/00; H01R 43/00; B23H 5/10
[52] U.S. Cl. .................. 219/69.15; 29/527.2; 29/825; 29/885; 156/DIG. 80; 156/DIG. 102; 204/289; 204/292; 204/293; 219/69.17; 219/121.2; 219/121.69
[58] Field of Search .................. 29/825, 885, 527.2; 204/292-293, 280, 286-289; 219/69.15, 69.17, 121.18, 121.2, 121.67, 121.69; 156/DIG. 80, DIG. 102

[56] References Cited

U.S. PATENT DOCUMENTS

| | | | |
|---|---|---|---|
| 3,435,520 | 4/1969 | Copeland | 29/885 X |
| 3,604,883 | 3/1969 | Dietz | 219/69.15 |
| 3,719,579 | 3/1973 | Cross et al. | 204/129.55 X |
| 4,084,308 | 4/1978 | Runge | 29/527.2 |
| 5,002,651 | 3/1991 | Shaw et al. | 204/290 R X |

OTHER PUBLICATIONS

Anonymous, "Method of Fabricating an Electrolytic Print Head Array," Research Disclosure, Nov. 1984, #247.
Micro-EDM, Hong Li and T. Masaki, Society of Manufacturing Engineers Technical Paper, MS91-485.
Micro Electro-Discharge Machining, T. Masaki, K. Kawata, T. Sato, T. Mizutani, K. Yonemoti, A. Shibuya and T. Masuzawa, Proceedings of International Symposium for Electro-Machining pp. 26-29, 1989.
Micro EDMing Excites the High-Tech Community, EDM Today, pp. 32, 34, 46, Mar./Apr. 1991.
Micro Electro-Discharge Machine Brochure, Panasonic Matsushita Research Institute, May 1990.
Electrical Discharge Machining, Dr. Hong Li, SME; sponsored by the Society of Mfging Engineers & the Machining Technology Association of SME, Sep. 17-18, 1991.

*Primary Examiner*—Donald R. Valentine
*Attorney, Agent, or Firm*—Ratner & Prestia

[57] ABSTRACT

A method of manufacturing a multiple microelectrode assembly is disclosed. Micromachining technology (such as micro-electrical-discharge machining technology, laser-beam micromachining, electron-beam micromachining) is used to manufacture an electrode/base assembly. The electrode/base assembly is placed within a container; a liquid material is placed into the container; the liquid material surrounds the electrodes of the electrode/base assembly and is allowed to solidify; and the solidified liquid material in combination with the electrode/base assembly is separated from the container. The bottom (or base) portion of the electrode/base assembly is then removed. The electrodes of the electrode/base assembly comprise a plurality of rod-like members of very small (on the order of 1 micron) metallic members of preselected dimension, shape and spacing, by which they are adapted in combination with the surrounding insulating material as a multiple microelectrode assembly.

10 Claims, 5 Drawing Sheets

1

METHOD OF MANUFACTURING A MULTIPLE MICROELECTRODE ASSEMBLY

FIELD OF THE INVENTION

The present invention relates to multiple microelectrode assemblies and more particularly to a method for manufacturing multiple microelectrode assemblies.

BACKGROUND OF THE INVENTION

A multiple microelectrode assembly comprises a plurality of conductive paths (i.e. electrodes) which are positioned substantially parallel to one another. The cross-sectional diameter of each electrode is desirably small, often on the order of microns. Furthermore, these electrodes are electrically insulated from each other.

Multiple microelectrodes are used, particularly in medicine and biotechnology, to transmit electrical signals along passageways and to make contact with individual cells within a living organism. Multiple micro electrode assemblies have a variety of applications including the control of damaged human nervous systems and auditory systems and the measurement of signals emanating from minute parts of living organisms.

A variety of methods are presently known for making multiple microelectrode assemblies. One such method is to make a multiple microelectrode assembly using integrated circuits (IC) processing. However, using IC processing, electrode materials are limited to semiconductor materials (e.g. silicon material). In addition, the resultant multiple microelectrode assemblies tend to have high internal strain. An alternative manner of producing multiple microelectrodes is by combining a plurality of individually insulated conductors into a single assembly. However, by producing a multiple microelectrode assembly in this manner, the distances between individual electrodes are fairly imprecise. In addition, a multiple microelectrode assembly thus produced is somewhat bulky, due to the presence of space and excessive insulation between the individual electrodes.

SUMMARY OF THE INVENTION

In accordance with the present invention, an electrode/base assembly which includes a base and a plurality of rod-like protrusions is formed by micromachining. The electrode/base assembly is placed within a container and a liquid molding material is introduced into the container. This liquid material is allowed to solidify. The solidified liquid material, attached to the electrode/base assembly, is separated from the container. The base portion of the electrode/base assembly is then cut away, resulting in the formation of a multiple microelectrode assembly.

DETAILED DESCRIPTION OF THE INVENTION

Figure 1A:
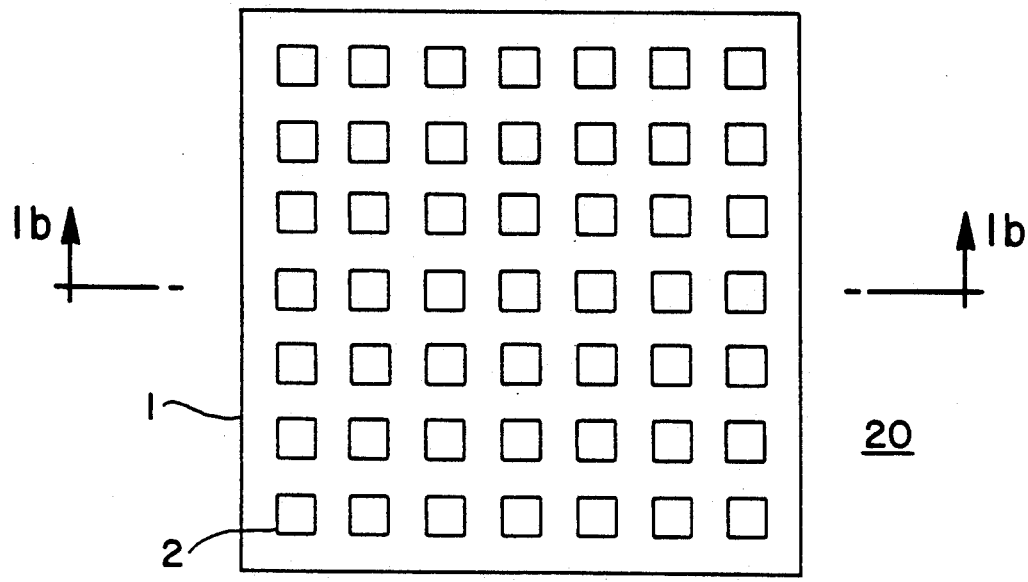
FIG. 1(a) is a top view showing the structure of a multiple microelectrode assembly.

Referring now to the drawings, an exemplary embodiment of the present invention will be described.

Figure 1B:
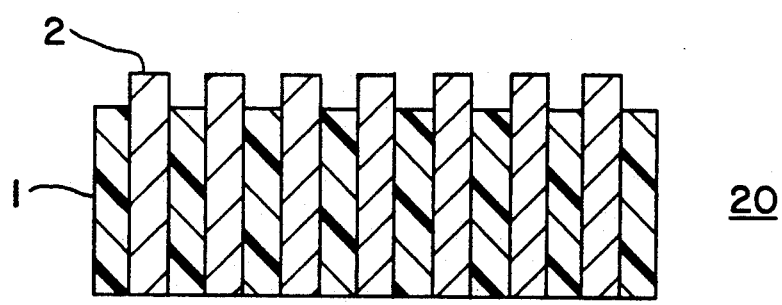
FIG. 1(b) is a side, cross-sectional view of the multiple microelectrode assembly of FIG. 1(a), taken in the plane 1b—1b shown in FIG. 1(a).

A top view of multiple microelectrode assembly 20, constructed in accordance with an exemplary embodiment of the present invention is shown in FIG. 1(a). A side, cross-sectional view of multiple microelectrode assembly 20, taken in the plane 1b—1b shown in FIG. 1(a) is shown in FIG. 1(b). Multiple microelectrode assembly includes a plurality of microelectrodes 2 surrounded by insulating material 1. Insulating material 1 may be any suitable insulating composition which can be converted, such as by a change in temperature (solidification of a melt for example) from a fluid state to a solid state. Exemplary materials which may be used for this purpose include essentially any conventional thermoplastic resin, such as a polyester resin. Each microelectrode 2 may be constructed from any type of conductive or semiconductive material.

Microelectrodes 2 are shown in FIG. 1(a) and FIG. 1(b) having an exemplary size and shape for illustrative purposes. However, it is understood that the microelectrodes 2 may be of essentially any pre-selected cross-sectional shape and dimension, the possible shapes including round, square, triangular, etc. The size of the microelectrodes may be any dimension larger than 1 micrometer. The spacing between the microelectrodes may be of any dimension larger than 4 micrometers. Although a predetermined number of microelectrodes are shown in FIG. 1(a) and FIG. 1(b), it is understood that any number of microelectrodes may be included in multiple microelectrode assembly 20 in any desired arrangement.

The multiple microelectrode assembly of FIG. 1(a) and FIG. 1(b) may be manufactured in accordance with the procedure described below. This procedure will be described with reference to FIGS. 2 through 5.

Figure 2A:
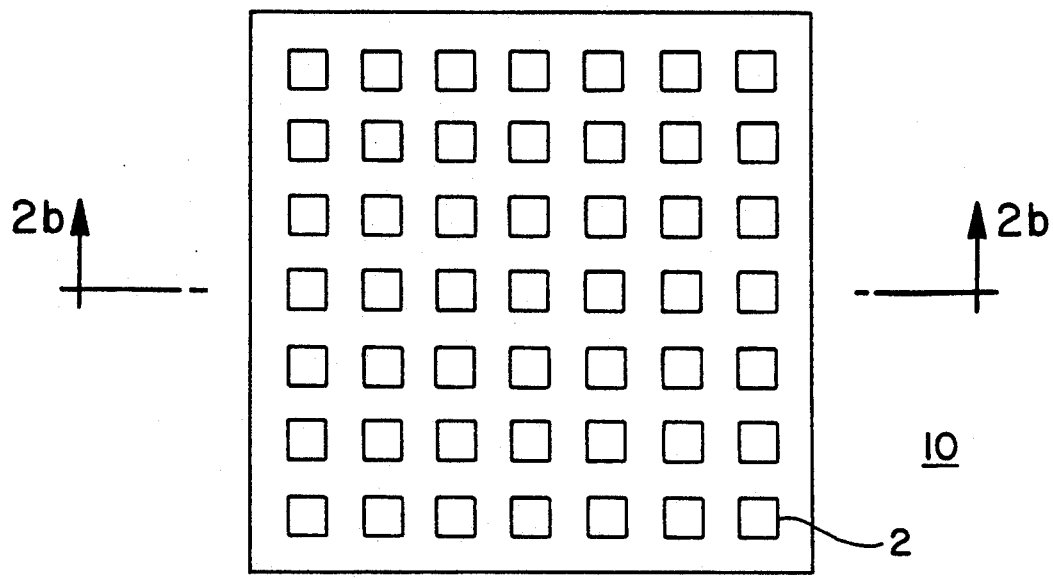
FIG. 2(a) is a top view of an electrode/base assembly suitable for forming the multiple microelectrode assembly of FIG. 1(a).
Figure 2B:
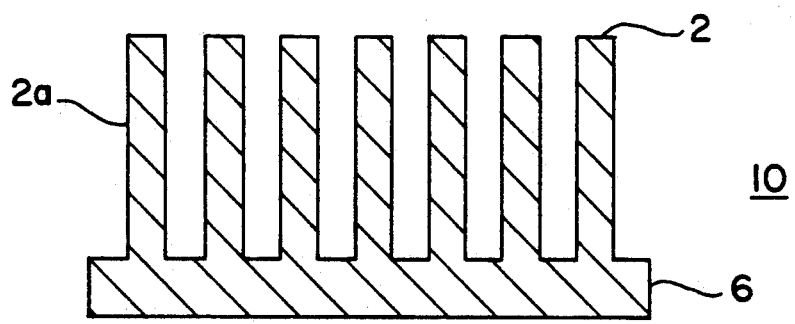
FIG. 2(b) is a side, cross-sectional view of the electrode/base assembly of FIG. 2(a), taken in the plane 2b—2b of FIG. 2(a).

In FIG. 2(a), a top view of electrode/base assembly 10, used for producing multiple microelectrode assembly 20, is shown. In FIG. 2(b), a cross-sectional view of electrode/base assembly 10 taken in the plane 2b—2b of FIG. 2(a), is shown. Electrode/base assembly 10 may be constructed of a variety of materials including stainless steel, copper, etc. The only requirements are that electrode/base assembly 10 be micro-machinable, as discussed below, and must remain solid under the conditions which produce a change of state (from fluid to solid) in the insulator composition to be used.

Electrode/base assembly 10 comprises a plurality of rod-like protrusions (in other words, electrodes) 2, extending from base 6 and arranged in N rows and M columns (where N and M are integers). This plurality of electrodes are of preselected size, shape and spacing to conform to the desired size shape and spacing of electrodes within multiple micro-electrode assembly 20.

In order to form a multiple micro-electrode assembly, adapted to transmit electrical signals to and/or from singular biological cells (for example), the multiple micro-electrode assembly is desirably formed having electrodes of spacing, shape and dimension which are precisely known. In accordance with the present invention, electrode/base assembly 10 is precisely constructed using micromachining technology. Examples of suitable micro-machining techniques for manufacturing electrode/base assembly 10 include micro electro-discharge machining, laser-beam micromachining or electron beam micromachining. The use of micro-machining technology is particularly desirable for the formation of electrode/base assembly 10, due to the highly precise structures which may be formed thereby.

In addition, the use of micro-machining technology allows for the formation of electrodes 2 with a tolerance of approximately 0.1 microns. In other words, electrodes 2 may each be formed with a variance of predetermined dimension less than $+/-0.1$ microns. This tolerance allows for the production of a multiple micro-electrode assembly which is suitable for a variety of applications, including the transmission of electrical signals to and/or from biological cells. However, it is understood that larger tolerances are acceptable depending on the application for which multiple microelectrode assembly 20 is being produced. Thus, the acceptable tolerance with which electrodes 2 are formed is largely application dependent.

While the tolerance of electrodes 2 may be critical for certain electrical transmission applications, multiple micro-electrode assembly 20 may not be effective for all types of electrical transmissions. For example, multiple microelectrode assembly 20 may not be effective for making contact with biological structures smaller than 1 micrometer, due to size limitations in the current state of the art of micro-machining technology. In these situations, the tolerance achievable with micro-machining technology is immaterial.

Apparatus suitable for performing micromachining with high dimensional tolerance is described in a variety of references, including MICRO EDM, Li, H. and Takeshi, M., Society of Manufacturing Engineers Technical Paper, MS91-485; *Micro Electro-Discharge Machining*, T. Masaki, K. Kawata, T. Sato, T. Mizutani, K. Yonemoti, A. Shibuya and T. Masuzawa, Proceedings of International Symposium for Electro-Machining, p, 26–29, 1989; *Micro EDMing Excites the High-Tech Community*, EDM Today, p. 32, 34, 46, March/April 1991; Micro Electro-Discharge Machine, Brochure, Matsushita Research Institute Tokyo Inc., May 1990, herein incorporated by reference for their teachings in the field of micro-machining.

Figure 3A:
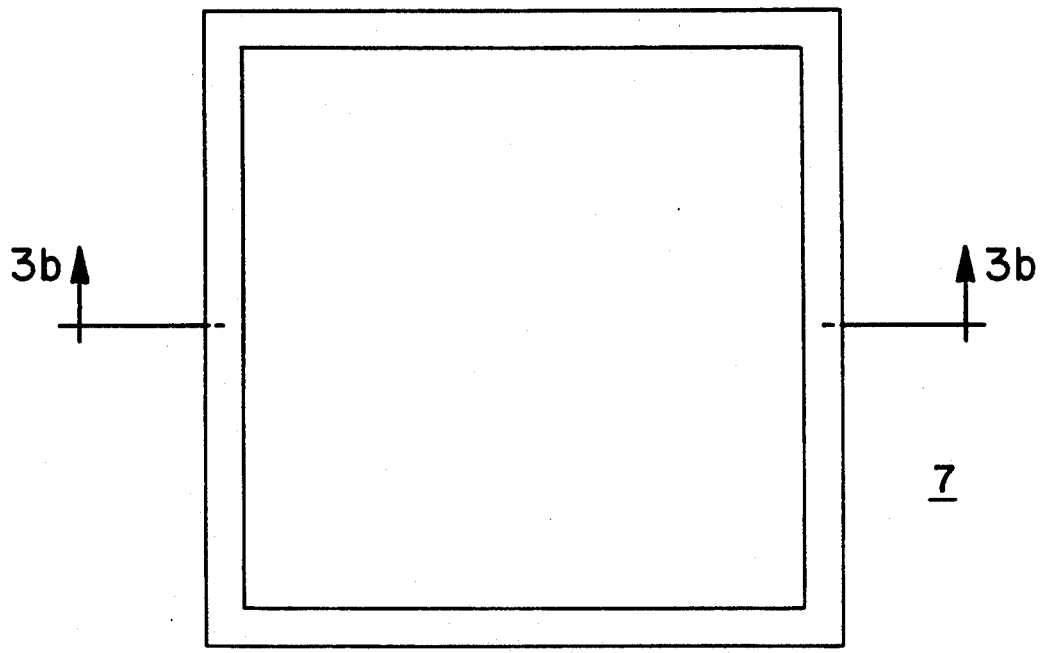
FIG. 3(a) is a top view showing a container which is suitable for holding the electrode/base assembly of FIG. 2(a).
Figure 3B:
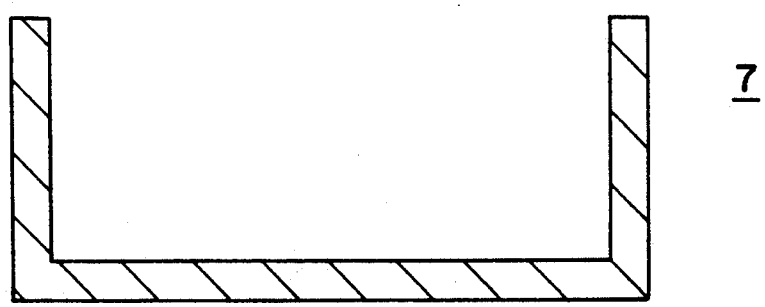
FIG. 3(b) is a side, cross-sectional view of the container of FIG. 3(a), taken in the plane 3b—3b of FIG. 3(a).

In FIGS. 3(a) and 3(b), a container 7 for containing electrode/base assembly 10 is shown. FIG. 3(a) is a top view of container 7. FIG. 3b is a cross-sectional side view of container 7 in the plane 3b—3b of FIG. 3(a).

Figure 4A:
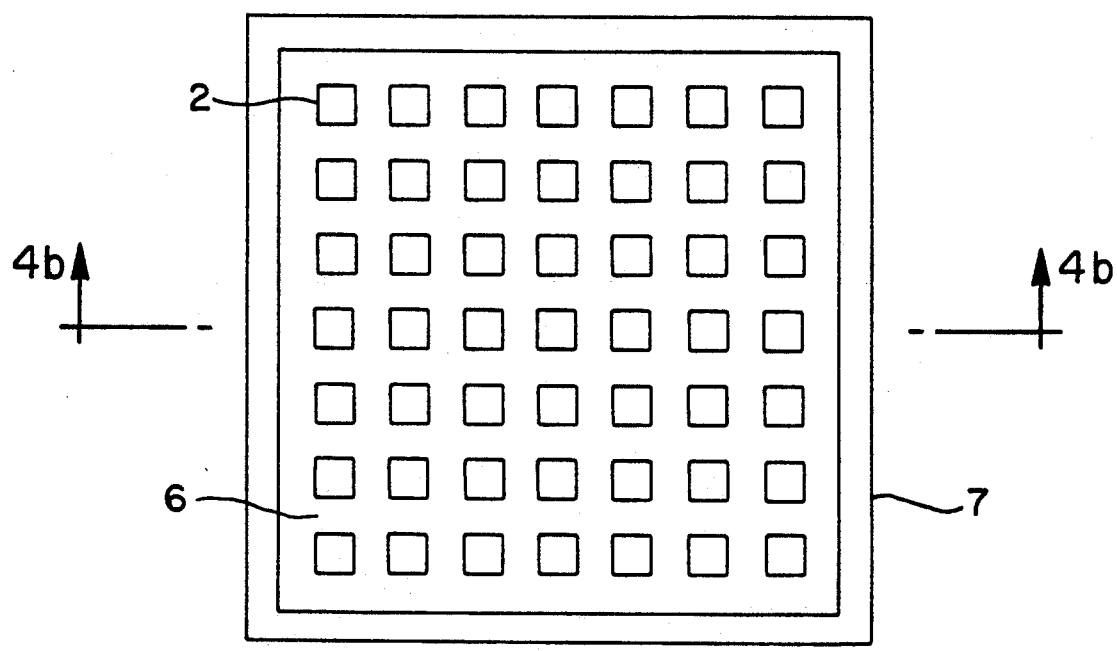
FIG. 4(a) is a top view of the container shown in FIG. 3(a) and the electrode/base assembly shown in FIG. 2(a), after assembly of the electrode/base assembly and the container, including an insulating composition in the interior space of the container.
Figure 4B:
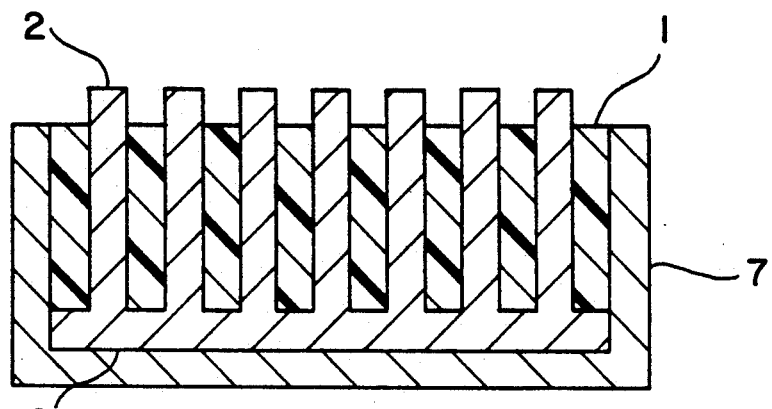
FIG. 4(b) is a side cross-sectional view of the container, electrode base assembly and insulating composition of FIG. 4(a), taken in the plane 4b—4b of FIG. 4(a).

In order to form multiple micro-electrode assembly 20, electrode/base assembly 10 is placed within container 7. Container 7 is then filled with a fluid insulating composition 1. Composition 1 may be a polymer (such as a polyester) or a ceramic. Composition 10 is then allowed to solidify. FIG. 4(a) is a top view of container 7 after electrode/base assembly 10 has been inserted therein and container 7 has been filled with composition 1. FIG. 4(b) is a side, cross-sectional view of container 7, electrode/base assembly 10 and composition 1, taken in the plane 4b—4b of FIG. 4(a).

Figure 5:
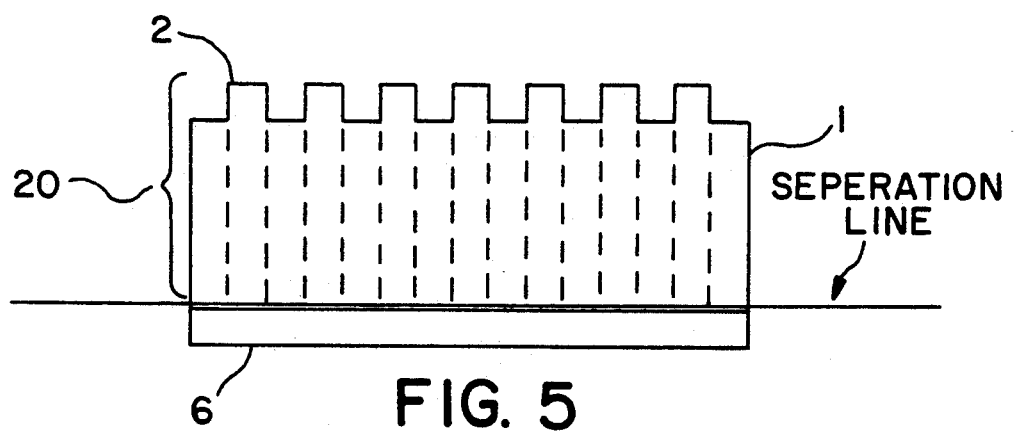
FIG. 5 is a side view of the electrode/base assembly and insulating composition of FIG. 4(a), after solidification of the insulating composition, and after removal of the solidified insulating composition and the electrode/base assembly from the container shown in FIG. 3(a).

After composition 1 has solidified, the combination of composition 1 and electrode/base assembly 10 is removed from container 7. A side view of this combination is shown in FIG. 5. The botton portion (base 6) of this combination is then removed (by micromachining, for example) along the separation line shown in FIG. 5. The remaining top portion is multiple micro-electrode assembly 20.

Furthermore, by varying the quantity of composition 1 used, it is possible for electrodes 2 to extend by any length beyond composition 1. The length of electrodes 2 extending beyond composition 1 may also be controlled by varying the dimensions of container 7. In this manner, composition 1 can only extend to the top of container 7. Any length of electrodes 2 extending beyond container 7 is thus not surrounded by composition 1.

It is also possible to connect multiple microelectrode assembly 20 to an electronic device (e.g. testing or monitoring circuitry) by interfacing one end of microelectrode assembly 20 to an appropriate connector, commonly known as as an integrated circuit plate (not shown). Interfacing to this connector may be accomplished using Tape Automated Bonding (TAB).

By forming multiple microelectrode assembly 20 in the manner described above, a plurality of electrodes 2 are formed having precisely known, preselected shape and size. In addition, the spacing between each electrode 2 is preselected and precisely known.

Thus, by forming a multiple microelectrode assembly with high dimensional tolerances using a micromachining apparatus, a finely detailed micro-filter may be produced in which the spacing, shape and dimensions of the electrodes are precisely controlled, with the dimension of each electrode on the order of 1 micron and with a dimensional tolerance on the order of 0.1 micron. Such a multiple microelectrode assembly may find particular application in the transmission of electrical signals to and/or from biological cells.

While the invention has been described in terms of an exemplary embodiment, it is contemplated that it may be practiced as outlined above, with modifications within the spirit and scope of the appended claims.

What is claimed is:

1. A method of manufacturing a multiple microelectrode assembly said method comprising:

forming an electrode/base assembly using micromachining, said electrode/base assembly including a base and a plurality of rod-like protrusions, each of said rod-like protrusions separate from each other and extending substantially perpendicular from said base;

placing the electrode/base assembly into a container;

introducing a liquid insulating composition into the container;

allowing the liquid insulating composition to solidify;

separating the insulating composition and the electrode/base assembly from the container; and removing the base of the electrode/base assembly to form the multiple microelectrode assembly.

2. A method of manufacturing a multiple microelectrode assembly in accordance with claim 1, wherein the diameter of each rod-like protrusion of said plurality of rod-like protrusions is greater than 1 micrometer.

3. A method of manufacturing a multiple microelectrode assembly in accordance within claim 1, wherein each rod-like protrusion of said plurality of rod-like protrusions has a dimensional tolerance on the order of 0.1 microns.

4. A method of manufacturing a multiple micro-electrode assembly in accordance with claim 3, wherein each rod-like protrusion is comprised of steel.

5. A method of manufacturing a multiple micro-electrode assembly in accordance with claim 3, wherein each rod-like protrusion is comprised of copper.

6. A method of manufacturing a multiple micro-electrode assembly in accordance with claim 3, wherein said insulating composition is comprised of a polymer.

7. A method of manufacturing a multiple micro-electrode assembly in accordance with claim 3, wherein said insulating material is comprised of a ceramic.

8. A method of manufacturing a multiple micro-electrode assembly in accordance with claim 1, wherein said electrode/base assembly is comprised of stainless steel or copper.

9. A method of manufacturing a multiple micro-electrode assembly in accordance with claim 1, wherein said insulating composition is comprised of a material selected from the group consisting of a polymer and a ceramic.

10. A method of manufacturing a multiple microelectrode assembly in accordance with claim 1, wherein micromachining includes one of micro-electro-discharge machining, laser-beam micro-machining and electron-beam micro-machining.

* * * * *